Figure 1:
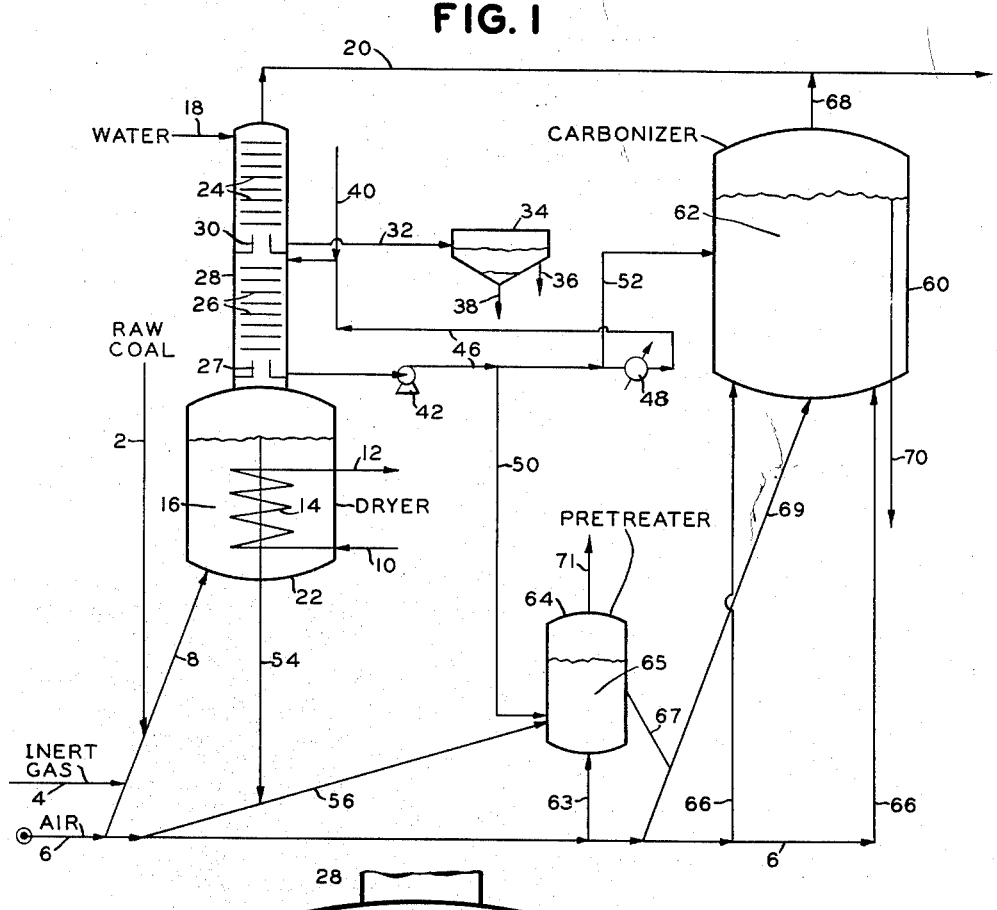

July 1, 1958  G. T. SKAPERDAS  2,841,534

FLUIDIZED CARBONIZATION

Filed Dec. 27, 1954

INVENTOR.
GEORGE T. SKAPERDAS
BY *H. H. Palmer*
ATTORNEYS

United States Patent Office 2,841,534
Patented July 1, 1958

2,841,534

FLUIDIZED CARBONIZATION

George T. Skaperdas, Fresh Meadows, N. Y., assignor to The M. W. Kellogg Company, a corporation of Delaware Application December 27, 1954, Serial No. 477,791

11 Claims. (Cl. 202—3)

This invention relates to the drying of carbonaceous solids such as coal, lignite, shale, etc., more particularly it relates to method and means for the drying and heating of carbonaceous solids prior to carbonization and/or gasification of said solids.

The treatment and/or conversion of carbonaceous materials to form valuable liquid, gaseous and solid products is well known in the art. An example of one process frequently employed entails the treatment of carbonaceous solids such as coal, lignite, shale, etc., at elevated temperatures whereby volatile materials are released from the solids and a valuable solid product is formed. This process is usually called carbonization. Another process also widely employed involves the conversion of similar carbonaceous materials to a gaseous product containing hydrogen and carbon monoxide, which may be used in the synthesis of organic chemicals, such as methanol, in the synthesis of high octane motor fuel components, in the preparation of a gas suitable for the synthesis of ammonia or as a fuel gas. The latter process which is called gasification, usually employs both steam and oxygen as reactants and may or may not include a solid material as a product. It has been the practice in the past to carry out carbonization and gasification processes in both non-fluid and fluid systems. The present invention is concerned with a carbonization or gasification process of the fluid type wherein the various steps are performed with a finely divided feed material which is maintained in a highly turbulent state of agitation.

One of the major problems encountered in handling carbonaceous materials, such as coal, in a fluidized system results from the tendency of the finely divided solids to agglomerate because of water contained thereon. Most coals coming from a treating plant, for example, have a relatively high water content usually between about 2 and about 15 percent by weight or higher. Unless removed this moisture causes the finely divided coal particles to stick together and resist fluidization, and even after fluidization the moisture may cause packing or bridging in process equipment of restricted cross-section, such as for example, in feed hoppers, standpipes, etc.

It has been suggested to dry carbonaceous solids with air and other gases at high temperatures. This method, although workable, suffers from several deficiencies. Because of the low heat capacity of most gases, sufficient heat for drying within a reasonable time is not provided by this method unless the drying gas is present in large quantities and at an elevated temperature. The use of a large amount of gas is expensive because of compression requirements and it complicates the recovery of solids from the drying medium. The use of elevated temperatures is also undesirable since high temperature may cause a substantial part of the volatile material in the coal to vaporize and mix with the drying medium and thus further complicate the recovery problem. Furthermore, if a coal of the so-called "plastic type" is to be dried, high gas temperatures may elevate the temperature of the coal to the plastic state and cause agglomeration of the coal particles.

Another problem encountered in the drying of fluidized carbonaceous solids relates to the recovery of solids entrained from the high density fluid solids mass. In the conventional system solids are maintained in a dense phase turbulent bed by passage therethrough of a fluidizing medium. The gases leaving the bed of highly turbulent solid particles entrain therefrom a portion of the lighter and/or smaller particles and form what is known as a dilute phase of low solid concentration above the dense bed. Some of the entrained particles fall back into the bed; however, many of them remain in the fluidizing medium. There are several means available which make it possible to recover a major portion of the entrained particles, including cyclone separators, porous filters, electrostatic precipitators and others. In spite of these recovery means, however, a portion of the solids escape in the fluidizing medium. The amount of solids removed from the system in this manner although small percentage-wise, namely usually below about 1 percent of the total solids introduced into the system, is substantial on a pound basis and is an important economic factor in the operation of a fluid system. This problem which is common to all fluid systems also exists in the drying of carbonaceous solids while in the fluidized state.

It is an object of this invention to provide an improved process and apparatus for drying carbonaceous solids in the fluid state.

Another object of this invention is to provide an improved process and apparatus for the carbonization and gasification of carbonaceous materials.

Still another object of this invention is to provide an improved process and apparatus for recovering tar compounds vaporized in the drying of fluidized carbonaceous solids.

Yet another object of this invention is to provide an improved method and apparatus for recovering solids entrained from a fluidized bed of carbonaceous solids.

These and other objects of the invention will become more apparent from the following detailed description and discussion.

Broadly this invention is carried out by indirectly heating carbonaceous solids in a dense phase fluidized bed in a drying zone for a sufficient period of time to vaporize and remove the water present therein and recovering entrained solids and tar vapors from the gases leaving the drying zone. As used herein, the phrases "water content of the carbonaceous solids" or "water present in the carbonaceous solids" are intended to designate surface or "free" water rather than water chemically fixed in the coal.

More specifically the above objects are realized by introducing finely divided carbonaceous solids into a dense phase fluidized bed in a drying zone wherein heat is transmitted to the solids by indirect heat exchange. Water vapor, tar vapors, fluidizing gas and entrained solid particles pass from the drying zone into a scrubbing zone wherein entrained solid particles are scrubbed from the gases. Scrubbing oil is supplied by oil vapors released from the carbonaceous solids in the drying zone and condensed in the scrubbing zone. The scrubbing oil and solids form a slurry, part of which is cooled and returned to the scrubbing zone and the remainder of which is passed to a reaction zone, such as for example a carbonization or gasification zone. The gases leaving the scrubbing zone enter a quenching zone wherein the water vapor and the remainder of the oil vapors are condensed with water. Separation of the liquid oil from the condensed water is effected in a settling zone. Dried carbonaceous solids are removed from the drying zone and are introduced in the aforementioned reaction zone.

Although this invention finds use in other processes in which fluidized carbonaceous solids are treated for the removal of water, such as for example in the drying of powdered coal for use as a fuel, it finds particular application in the carbonization and gasification of solid carbonaceous materials. For purposes of clarity in describing the application of the invention reference will be had primarily to a coal carbonization process. This, however, is not intended in any way to limit the scope of the invention.

The carbonization of coal to remove distillable tars therefrom and produce a char residue product is conducted over a wide range of temperature, usually between about 700° F. and about 2400° F. The preferred thermal range of operation is dependent to a great extent on the type of liquid product desired. For example, when it is preferred to distill the coal tars with a minimum of cracking of volatile constituents the temperature is held to a minimum of about 700° F. and not more than about 1000° F. The type of coal is also of importance in establishing the operating temperature since some coals are more difficult to distill than others.

When carrying out a fluidized carbonization process, it is necessary to entrain the coal in a gasiform material. This material usually serves the dual purpose of providing a fluidizing medium and also the heat required to maintain the temperature in the carbonization zone. It may comprise an inert gas such as a flue gas, heated to a high temperature to supply the heat required in the carbonizer or it may be a combustible gas such as fuel gas mixed with oxygen, the combustion of which supplies the heat required in the carbonizer or it may be oxygen or an oxygen containing gas the combustion of which with a portion of the coal feed provides the thermal energy required in the carbonizer. Still another method of supplying the heat required in the carbonization comprises recycling char product heated to a temperature substantially above the temperature in the carbonizer. Carbonization may be carried out over a wide range of pressures, however, usually the pressure is maintained between about atmospheric and about 500 p. s. i. g., preferably between about atmospheric and about 100 p. s. i. g.

Substantially all of the distillable constituents of coal are removed at the aforementioned carbonization temperatures within a very short period of time, that is, between about 0.25 and about 10 minutes. In order to minimize agglomeration of the coal particles when the coal passes through the plastic state, usually in the temperature range between about 700° F. and about 850° F., it is customary to maintain a substantial ratio of char to fresh feed in the carbonizing zone. This serves to dilute the fresh feed which provides the desired beneficial effect, however, it also makes it necessary to substantially increase the coal residence time in order to provide a reasonable size reaction zone. At the usual char to fresh feed ratios maintained in the carbonizing zone, that is, between about 5 pounds per pound and about 50 pounds per pound, the residence time is between about 2 minutes and about 200 minutes, more usually, between about 20 minutes and about 100 minutes.

Another method of minimizing agglomeration of the coal particles is to provide a pretreating zone wherein the coal particles are reacted with oxygen at a temperature substantially below that existing in the carbonizing zone, that is, between about 400° F. and about 600° F. By controlling the time and extent of oxidation, it is possible to alter the characteristics of the coal and thereby decrease the tendency of the coal particles to agglomerate. The amount of oxygen introduced into the pretreating zone is controlled to allow only sufficient oxidation to "case harden" or otherwise alter the surface physical characteristics of the coal and thus decrease the stickiness of the coal particles.

Similar processing considerations are important and similar operating conditions are required for the carbonization of other solid carbonaceous materials. The conditions appropriate for each specific feed material are well known to those skilled in the art and repetition of them would serve no purpose here. Similarly the operating conditions, type of reactants, reactant ratios, etc. employed in carrying out the gasification of coal and other carbonaceous solids are well known in the art and therefore do not need repeating. It is contemplated that any of the well known processing expedients and schemes employed in carbonization and gasification and well known in the art may be used within the scope of this invention.

When drying a carbonaceous material such as coal it is necessary that the raw feed be heated to an elevated temperature and maintained there for a period of time sufficient to remove all or a major portion of the moisture. In general, coals vary in moisture content, containing usually between about 2 and about 15 percent or higher by weight of water. It is not usually economically feasible to remove all the moisture from the coal and it has been found that agglomeration and packing of coal particles due to the presence of water, is minimized if between about 50 percent and about 90 percent of the water initially present is removed. This is accomplished by heating the coal particles to a temperature between about 220° F. and about 500° F. and holding the solids at this temperature for between about 1 and about 15 minutes.

In the method of this invention the coal is heated by indirect heat exchange with heat transfer surfaces disposed within a dense turbulent fluidized bed of coal particles. The heat transfer surface is provided by a suitable arrangement of coils or tubes or the like constructed of suitable metals or alloys capable of withstanding elevated temperatures. The heat required to dry the coal is provided by a fluid heating medium which may be a petroleum oil or vapor or mixtures thereof or other liquid or vapor material which is easily transported and can withstand relatively high temperatures. In general, liquid heating fluids are more satisfactory because of their high specific heats and low volume relative to gases. Examples of suitable heating fluids are residual petroleum oils, synthetic heat transfer materials, inorganic salt mixtures, lead, mercury, etc. The temperature at which the heating medium is employed varies with the temperature maintained in the drying zone and with the heat transfer characteristics of the heating medium. Usually it is preferred to maintain the heating medium at a temperature between about 350° F. and about 1000° F. Temperatures greater than this are not desirable because of the danger of over heating coal particles in contact with the heat transfer surface.

Two major products are obtained in the carbonization of carbonaceous materials, a tarry liquid material and a solid carbonaceous residue. The liquid product which is commonly known as "tar" comprises numerous organic compounds of varying boiling points. The solid residue from carbonization is called "char" when produced from a coal feed material. As used hereinafter the term "tar" comprises any volatile organic compounds released from carbonaceous solids in a carbonization process, either liquid or vapor and either cracked or uncracked, and the term "char" comprises any solids remaining after carbonization. Inasmuch as the solids drying process described herein involves heating of the solids, some lower boiling tar compounds are unavoidably vaporized in the drying step and pass from the drying zone in the fluidizing medium. The amount of tar so vaporized varies with the feed material being dried and the drying temperature, however, generally the tar vapors comprise between about 1 percent and about 3 percent by weight of the raw carbonaceous feed. In addition to the tar, a portion of the solid carbonaceous particles are entrained in the fluid medium and also pass from the drying zone. In the method of this invention both carbonaceous solids and tar are removed from the drying zone effluent gases in a scrubbing zone by condensing the tar vapor and scrubbing solids from the gases with the tar condensate. A mixture of tar and solids is then removed from the system for further disposition.

In order to keep heat exchange surface to a minimum, it is preferred to condense only a portion of the tar vapors entering the scrubbing zone, usually between about 20 percent and about 50 percent, although if desired a greater percentage or all of the vapors may be condensed. To provide the desired degree of condensation, it is necessary to cool the effluent gases from the drying zone to between about 200° F. and about 400° F. After removal of the solids, the cooler effluent gases are passed from the scrubbing zone to a quenching zone wherein the remaining tar vapors and water vapor are condensed. Separation of the tar from the water condensate provides a valuable material which may be combined with the tar product from the carbonizer or otherwise disposed of. Water is preferably used for quenching the gases and to assure condensation of all the tar vapor the gases are quenched to substantially ambient temperature, that is, to between about 50° F. and about 100° F.

The mixture of condensed tar and solids produced in the scrubbing zone is removed herefrom as a slurry. Depending on the use to which the dried carbonaceous material is to be put, several dispositions may be made of this stream. For example, when coal is being dried for use as a fuel, such as in a process furnace or in a boiler for the generation of steam, the tar-coal slurry may be introduced separately into the furnace or boiler and also consumed as fuel. When the dried coal is subsequently processed in a carbonization unit several uses of the slurry are available. Inasmuch as the coal particles leaving the scrubbing zone are thoroughly wetted with tar it may be desirable to introduce them into the carbonizer zone preferably below the level of the dense phase bed where they will be exposed to a high temperature and have a chance to increase in size through coking of heavier tar components. In such an operation the portion of the tar revaporized in the carbonizer is recovered with the carbonizer tar product and the enlarged and/or heavier solids present in the slurry pass from the carbonizer with the char. When it is contemplated using tar produced in the carbonizer as a fuel the presence of a small amount of solids is not detrimental. Therefore, in this instance, the slurry may be combined with the carbonizer tar product. Of course, the slurry may be used as a separate fuel in a furnace or boiler or other suitable combustion chamber immaterial of the final use of the dried coal. Uses of the oil-coal slurry similar to those discussed are also contemplated when the coal is dried for subsequent gasification. In addition, comparable uses may be made of the slurry which is obtained from the scrubbing zone when carbonaceous materials other than coal are dried.

In a typical carbonization process the feed material, such as coal, lignite, shale or other carbonaceous solids is crushed and ground to a size suitable for fluidization and is passed into a drying zone as previously described. For ease of fluidization it is preferred to treat material sized between about 10 and about 325 mesh, although more finely divided solids and solids up to ¼ inch in diameter may be handled if desired. In the drying zone the solids are maintained in the turbulent state by passing therethrough a gasiform material at a velocity of between about 0.5 and about 10 feet per second. The fluidizing medium may comprise air, flue gas, steam or any other suitable gaseous material. In carrying out the drying process, the solids are elevated in temperature by indirect heat exchange and are held in the drying zone for a sufficient period of time to vaporize and remove therefrom the major part of the water present. The pressure in the drying zone may vary from atmospheric to as high as several hundred pounds per square inch; however, since the drying operation is readily carried out at low pressure it is preferred to operate at or near atmospheric pressure. The material within the drying zone as previously described forms a dense phase bed of high solids concentration above which there is a dilute phase bed of low solids concentration. The gases leaving the dense phase zone and entering the dilute phase comprise a mixture of the fluidizing medium, water vapor and volatile tar compounds released from the carbonaceous solids. These gases with entrained solids pass through the dilute phase zone into a scrubbing zone wherein the temperature is lowered to condense a portion of the tar and the condensate is used to remove the solids. In order to assure good contact between the tar and solids in the scrubbing zone it is provided with a number of trays or baffles or with a suitable packing material. Since no tar liquid is available when starting up the process, it is necessary to provide a scrubbing oil from an outside source until sufficient tar is condensed for this purpose. The oil provided may be a tar similar in composition to the tar recovered from the drying zone gases, it may be a tar of entirely different composition, or it may be a hydrocarbon oil. When using certain types of feed materials it may be desirable in order to provide a more suitable wash material, to dilute the tar with an oil of different physical properties. This is preferably accomplished by introducing the diluting oil continuously into the scrubbing system.

The gases leaving the scrubbing zone contain the total water vapor and the uncondensed portion of the tar released in the drying zone. This stream is passed into a quenching zone wherein it is contacted with water in sufficient quantity to condense both the water vapor and the tar. This zone also contains trays, baffles or a packing material arranged to provide good contact between the vapor stream and the quench water. The liquid condensate is withdrawn from the tower for the separation of water and tar, and the uncondensed gases are vented from the system.

In order to more clearly illustrate the invention and provide a better understanding thereof, reference is had to the accompanying drawings which are diagrammatic illustrations of process arrangements suitable for carrying out an embodiment of this invention.

Figure 1 contains in cross-section a coal dryer vessel wherein the heat required for drying is supplied by indirect heat exchange with a hot fluid, equipment for scrubbing and quenching gases from the dryer and a pretreater and carbonizer vessels.

Figure 2:
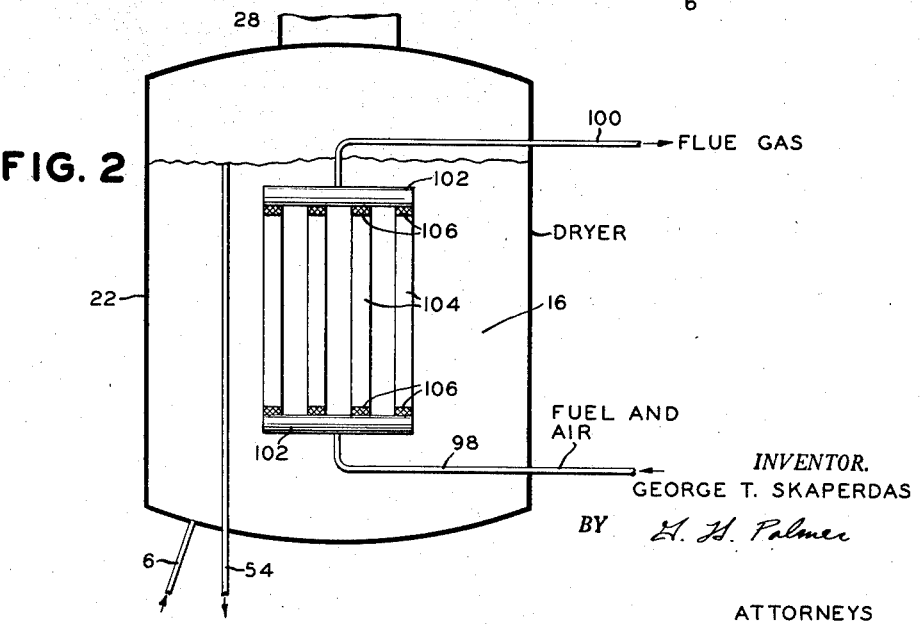

Figure 2 contains in cross-section a coal dryer vessel wherein the heat required for drying is supplied by indirect heat exchange with hot fluidized solids, and equipment for scrubbing and quenching gases from the dryer.

Referring to Figure 1, a bituminous coal at atmospheric temperature having a particle size between about 10 and about 325 mesh and containing about 8 percent by weight of water is passed from standpipe 2 into conduit 8 where it is entrained in a flue gas admitted through conduit 4. The gas-solids mixture passes into a cylindrical elongated dryer 22 wherein it is maintained in a highly turbulent state to form a dense bed of fluidized solids. The temperature within the solids bed is maintained at about 300° F. by transferring heat indirectly from exchanger 14 which comprises a conventional tubular coil or other suitable conventional heat exchange means. The heat required to elevate the solids from an initial temperature of about 80° F. to the bed temperature is provided by a circulating liquid oil stream which enters exchanger 14 through conduit 10 at a temperature of about 800° F. and leaves through conduit 12 at a temperature of about 600° F. The carbonaceous solids are retained in the dryer for a sufficient time to reduce the moisture content of the coal to about 1 percent, namely about 10 minutes. The dry coal particles are then passed through conduit 54, where they are entrained in air from conduit 6 and the mixture is passed through conduit 56 into a pretreater zone 65.

The gases leaving the dense phase bed of solids in the dryer contain water vapor removed from the solids and a portion of the lighter and smaller coal particles. This material is passed through a conventional cyclone separator wherein the major part of the entrained solids are removed; however, the gases leaving the cyclone still contain some solids, in this specific example about 0.5 percent by weight of the solids admitted to the dryer. Passing from the dryer, the gases are introduced into a scrubbing zone 26 which contains a number of baffles arranged to provide intimate vapor-liquid contact. Removal of entrained solids from the dryer gases is effected in this zone by the scrubbing action of a liquid oil passed downwardly countercurrent to the ascending gases. A mixture of solids and liquid accumulates on a donut tray 27 in the lower portion of the scrubbing zone and is withdrawn therefrom as a slurry by pump 42. The mixture is then passed through conduit 46 and a conventional water cooler 48 and is returned to the top of the scrubbing zone for reuse.

In addition to water vapor and solids, the effluent gases from the dryer 22 contain volatile lower boiling tar materials released from the coal during the drying process. As this material forms a part of one of the valuable products of carbonization its recovery is desirable, and is preferably effected in conjunction with the solids removal step just described. In the method of this invention, the vapors passing through the scrubbing zone are cooled by contact with a low temperature liquid scrubbing oil and higher boiling tar vapors are thereby condensed. The condensate becomes a part of the scrubbing oil-solids mixture and joins the slurry which is circulated through pump 42 and cooler 48. The amount of tar vaporized in the dryer is small, amounting to about 15 pounds per 1000 pounds of coal dried. Of this, only about 30 percent is condensed in the scrubbing zone. This, of course, is not sufficient to provide continuously the quantity of scrubbing oil required for the removal of the entrained solids, therefore, recycle of the scrubbing oil is required. To provide adequate scrubbing when the drying system is initially started up an extraneous scrubbing liquid is supplied by introducing tar from a previous operation through conduit 40. After the process has been operated over a period of time, usually about 10 days, sufficient tar accumulates within the system to displace the outside oil.

As soon as the circulating scrubbing oil system is operating at capacity, it becomes necessary to remove the net tar condensed in the scrubbing zone and this is done by passing a portion of the tar-solids slurry into a carbonizer zone 62 through conduit 52. If desired, the net slurry may be introduced instead into the pretreater zone 65 through conduit 50, however, the former procedure is preferred. The circulation of cool tar slurry through the scrubbing zone is maintained at a sufficient rate to lower the temperature of the dryer gases to about 275° F. This, of course, causes only a portion of the tar in these vapors to condense. In order to remove the remainder of the tar, the vapors are passed overhead from the scrubbing zone into a quench zone 24 wherein the tar and water vapors are condensed by contact with water admitted to the tower through conduit 18. This zone also contains means whereby good vapor-liquid contact is assured. A mixture of tar and water accumulates in a donut tray 30 and is withdrawn therefrom through conduit 32 and admitted into a separator 34. The tar being heavier is separated from the bottom of this vessel through conduit 38 and the water is separated through conduit 36.

The aforedescribed method of drying carbonaceous solids provides a process wherein the loss of solids and tar compounds is held to a minimum. By the use of indirect heat exchange from a hot fluid to a dense fluidized bed of solids a high heat transfer rate is obtained and the process is carried out without high compression costs, and solids recovery costs which would result from drying by direct contact with hot gases. The recovery system utilized is efficient and economical to operate. The use of tar condensed in the scrubbing zone to effect recovery of entrained solids removes the need for an outside scrubbing oil and the disposition of the net solids-tar slurry assures maximum solids recovery. Although it is within the scope of the invention to condense and recover all or the major portion of the tar in the scrubbing zone a separate quenching zone as described is preferred in order to keep water out of the tar-solids slurry, reduce the heat exchange required for cooling the tar slurry and decrease the heat required in the carbonizer for tar vaporization. The fact that the tar introduced into the carbonizer is subject to possible oxidation is an additional reason for keeping this stream to a minimum.

Coal leaving the dryer is admitted into the previously mentioned pretreating zone 65 where it is partially combusted with oxygen at a temperature of about 600° F. to reduce the agglomerating tendency of the coal particles. Oxygen required for this treatment is supplied from fluidizing air admitted to the pretreating zone through conduit 63. The treated coal particles then pass from the pretreating zone through conduit 69 into a carbonizer zone 62 where volatile tar materials are vaporized at a temperature of about 925° F. The heat required for the latter operation is provided by the fluidizing air introduced through conduit 69. If desired, additional air may be introduced directly into the carbonizer zone through conduit 66. The tar vapors and combustion gases are passed overhead from the carbonizer through conduit 68 for further processing (not shown) and the char product of the process is removed from the carbonizer through conduit 70, also for further processing. Both the pretreating and carbonizing operations are carried out in conventional fluid beds and under operating conditions of temperature, pressure, space velocity, reactant ratios, etc., as previously mentioned.

In the usual commercial coal carbonization unit a hot liquid oil stream will be available for use in the drying zone illustrated by Figure 1. There is a possibility, however, that a suitable heat exchange medium either will not be available or will be more useful in another service. In such a case, a similar type of drying system may be used wherein the heat is supplied from hot particles of fluidized catalyst confined within a tubular heat exchanger. In carrying out a drying process with this heating medium a hydrocarbon fuel and an oxygen containing gas such as air, in suitable proportions to provide combustion, are preheated and introduced into the exchanger wherein a combustion reaction takes place. The reactant quantities are controlled to provide a gas velocity within the heater sufficient to fluidize and violently agitate the catalyst particles. Heat released in the combustion reaction is absorbed by the catalyst and transmitted therefrom through the enclosing walls of the heat exchanger.

Any suitable catalytic materials which promote oxidation reactions may be used in carrying out this aspect of the invention, such as, for example copper, cobalt, iron, nickel, aluminum, palladium, platinum, silver, vanadium, etc., and alloys and oxides thereof. These materials can be used singly or in mixtures of one or more metals in varying proportions. In some cases it may be desirable to use a non-catalytic material in conjunction with the catalyst as a support material. In such a case any conventional refractory material commonly used as a support may be so employed. Any hydrocarbon or mixture of hydrocarbons commonly used as fuels may be burned in the exchanger, however, more usually a gaseous fuel is preferred. The combustion reaction may be initiated in any conventional manner, such as for example by preheating the reactants or by employing a pilot flame, a spark igniter, etc. The fuel and air may be introduced into the exchanger separately or they may be introduced as a mixture. The heat exchanger is constructed to allow free passage of gases, however, the catalyst is confined therein and is free to move only within the volume provided by the exchanger. The amount of catalyst employed may vary, however, a sufficient quantity should be present to provide a fluidized density of between about 20 and 100 pounds per cubic feet, the higher densities being characteristic of non-supported metallic catalysts. The amount of fuel and air required for combustion and the temperature maintained within the exchanger will vary depending on the quantity of heat exchange surface provided, the drying zone temperature and the rate of coal feed to the drying zone. In general, the temperature maintained within the tubes when operating under comparable conditions is about the same as that required when using a liquid heat transfer medium, more usually between about 350° F. and about 1000° F. To provide a good rate of heat transfer from the hot combustion catalyst to the wet coal it is necessary to maintain the catalyst in a state of fluidized turbulence. This may be done in the conventional manner, that is by providing within the exchanger a superficial linear gas velocity between about 0.5 and about 10 feet per second. Since the combustion gases form the fluidizing medium, control of both catalyst agitation and catalyst temperature is provided by adjusting the rate of introduction of hydrocarbon fuel and air.

The application of this aspect of the invention is perhaps more clearly described by reference to a specific application thereof, as illustrated by Figure 2. Referring to Figure 2, the drying zone heat exchanger comprises a number of vertical tubes 104 of a composition suitable to withstand elevated temperatures, disposed within a dense phase fluidized bed of coal. Each of the tubes contains a nickel oxide combustion catalyst in the form of finely divided fluidizable solid particles sized between about 50 and about 400 mesh. Passage of the catalyst from the tubes in either direction is prevented by porous plugs 106 which are designed to allow the passage therethrough of gases but not solids. At either end of the tubes are headers 102 which serve to distribute the gases admitted into the tubes and collect gases leaving the tubes. A mixture of preheated fuel gas and air in a suitable ratio to provide substantially complete combustion is introduced through conduit 98 into entrance header 102, and passed into the catalyst tubes 106 wherein a combustion re-action takes place. The tubes are sized so that the quantity of combustion gases passing therethrough is sufficient to provide a superficial linear gas velocity of about 3 feet per second thereby maintaining the catalyst particles in a fluidized state; sufficient catalyst is provided in the tubes to give a fluidized catalyst density of about 35 pounds per cubic foot. The presence of the catalyst in the exchanger promotes the combustion of the fuel gas and air whereby large quantities of heat are released and the catalyst particles are heated to about 900° F. The combination of high temperature and violent agitation of the catalyst particles provides a heat exchange medium having a much higher heat transfer rate than would exist if gases alone were used to transmit the heat. The flue gases leaving the catalyst tubes pass into the exit header 102 and from the dryer zone through conduit 100.

The drying process and the tar and solids recovery process associated with this heat exchanger are similar to the previously described system illustrated in Figure 1.

It is to be understood that the specific heat exchanger in the preceding illustration is merely one embodiment of an apparatus suitable for transferring heat with a fluidized heat exchange medium. Other heat exchanger arrangements, such as for example horizontal rather than vertical tubes, finned tubes, etc., are also used within the scope of the invention.

A typical application of this invention on a commercial scale is illustrated by the following data.

*Example*

| Flows: | Lb./hr. |
|---|---|
| Raw coal— | |
| 10 to 325 | 400,000 |
| Water content | 32,000 |
| Dried coal | 376,000 |
| Water content | 8,000 |
| Gases from dryer— | |
| Tar | 5,500 |
| Solids | 1,800 |
| Water | 24,000 |
| Tar condensed in scrubber | 1,700 |
| Circulating tar | 200,000 |
| Air to pretreater | 75,000 |
| Air to carbonizer | 45,000 |
| Tar from carbonizer | 54,000 |
| Char product | 300,000 |

| Temperatures: | ° F. |
|---|---|
| Dryer | 400 |
| Scrubber | 350 |
| Quench tower | 100 |
| Pretreater | 600 |
| Carbonizer | 950 |

| Pressures: | P. s. i. g. |
|---|---|
| Dryer | 5 |
| Scrubber | 4 |
| Quench tower | 3 |
| Pretreater | 6 |
| Carbonizer | 3 |

| | Lb./lb. |
|---|---|
| Carbonizer zone char to fresh feed ratio | 10 |

| Average residence time of coal in: | Minutes |
|---|---|
| Dryer | 10 |
| Pretreater | 20 |
| Carbonizer | 40 |

| Gas velocity in: | Ft./sec. |
|---|---|
| Dryer solids bed | 2.0 |
| Pretreater solids bed | 1.8 |
| Carbonizer solids bed | 1.8 |

| Density of: | Lb./cu. ft. |
|---|---|
| Dryer solids bed | 30 |
| Pretreater solids bed | 25 |
| Carbonizer solids bed | 20 |

Heat exchanger (liquid heat exchange medium):
| | |
|---|---|
| Vacuum reduced crude, 10 API lb./hr. | 600,000 |
| Temperature— | |
| In ° F. | 700 |
| Out ° F. | 500 |
| Carbon steel tubular heat exchanger outside surface area ft. sq. | 20,000 |

Heat exchanger (fluidized catalyst exchange medium):
| | |
|---|---|
| Nickel oxide catalyst, 200–400 mesh lb. | 10,000 |
| Catalyst fluidized density lb./ft. cu. | 30 |
| Fuel gas lb./hr. | 3,500 |
| Air lb./hr. | 500,000 |
| Temperature in tubes ° F. | 1,000 |
| Flue gas temperature ° F. | 1,000 |
| Velocity of gases in tubes ft./sec. | 2.5 |
| Carbon steel tubes and headers outside surface area ft./sq. | 15,000 |

In carrying out this invention variations and modifications of the previously described process may be used. For example, it is contemplated that sufficient tar will be condensed in the scrubbing zone to adequately slurry the solids scrubbed from the drying zone effluent gases. It may be necessary depending on the particular carbonaceous material to be dried to adjust the temperature in the scrubbing zone to provide more or less tar condensate. If maximum cooling within the scrubbing zone does not provide sufficient tar for adequate slurrying, it may be necessary to introduce additional tar or oil through conduit 40. It is also contemplated that the tar condensed in the scrubbing zone will have suitable characteristics to provide a good scrubbing material. Again, however, the properties of the tar will depend on the carbonaceous material being dried; and, if necessary, the tar may be augmented by the admission of oil or tar of different properties through conduit 40. The particular carbonization process described illustrates only one use of the carbonaceous material after drying, and as previously described, other subsequent uses are within the scope of the invention, including gasification to produce a gas rich in hydrogen and use of the carbonaceous material as a fuel. Also other dispositions of the oil-solids slurry yielded from the scrubbing zone as previously described, are within the scope of the invention. Furthermore, the specific carbonization process illustrated may be modified in various ways, for example, when carbonizing a coal of the nonplastic type, the pretreating zone may be omitted and the dried coal introduced directly from the drier into the carbonizing zone. Another variation in the illustrated application of the invention embodies the use of inert solid materials rather than a combustion catalyst in the heat exchanger tubes, although the catalyst is preferred.

Having thus described the invention by reference to a specific application thereof, it should be understood that no undue limitations should be imposed by reason thereof, but that the scope of the invention is defined by the appended claims.

I claim:

1. In a process in which a finely divided fluidized carbonaceous material is introduced into a reaction zone maintained under conditions of elevated temperature suitable to produce a conversion product, the improvement which comprises introducing the finely divided solid carbonaceous material into a drying zone where it is maintained in a dense highly turbulent fluidized bed, heating the fluidized bed of carbonaceous material to an elevated temperature by indirect heat exchange to remove water and only a minor proportion of the tarry constituents therefrom, passing the dry carbonaceous material to the reaction zone, passing drying zone effluent gases containing water vapor, entrained carbonaceous solids and tar compounds vaporized from said carbonaceous material to a scrubbing zone, condensing tar compounds in the scrubbing zone and using the liquid to scrub solids from the effluent gases, yielding a slurry of tar compounds and solids to the reaction zone, passing the gases from the scrubbing zone to a quenching zone wherein they are quenched with water to condense therefrom water vapor and any remaining tar compounds and separating condensed tar from the water condensate.

2. The process of claim 1 in which the heat required to dry the carbonaceous solid material is supplied by a hot fluid passed through the drying zone in indirect heat exchange with the solid carbonaceous material therein.

3. The process of claim 1 in which condensed tar and solids are removed from the scrubbing zone as a slurry, cooled, a portion of the slurry is returned to the top of the scrubbing zone to condense tar and scrub solids from the drying zone effluent gases and the remainder of the slurry is passed to the reaction zone.

4. The process of claim 1 in which the solid carbonaceous material is a coal containing distillable gaseous and tarry constituents.

5. The process of claim 1 in which said fluidized bed of carbonaceous material is heated to a temperature high enough to vaporize substantially the whole of the water mechanically associated with said solid carbonaceous material but materially below the range wherein major proportions of the gas and tar content of said carbonaceous material are distilled therefrom.

6. The process of claim 1 in which said solid carbonaceous material in said drying zone is maintained under substantially non-oxidizing conditions.

7. The process of claim 1 in which the heat required to dry the carbonaceous material is transferred through a heat exchange diaphragm contacted on one side by the dense fluidized bed of carbonaceous solids and on the other side of a confined fluidized bed of finely divided combustion catalyst, said heat supplied to said combustion catalyst by the combustion of a hydrocarbon fuel and air introduced into the confined combustion catalyst in proportions to provide a hot combustion mixture and to fluidize said confined combustion catalyst.

8. A method of drying carbonaceous solids which comprises introducing the carbonaceous solids in the form of finely divided particles into a drying zone where they are maintained in a dense highly turbulent fluidized bed, heating the fluidized bed of carbonaceous solids to an elevated temperature by indirect heat exchange to remove water and only a minor proportion of the tarry constituents therefrom, removing dry carbonaceous solids from the drying zone, passing drying zone effluent gases containing water vapor, entrained carbonaceous solids and tar compounds vaporized from the carbonaceous solids during drying to a scrubbing zone, condensing tar compounds in the scrubbing zone and using the liquid to scrub solids from the effluent gases, yielding a slurry of tar compounds and solids, passing the gases from the scrubbing zone to a quenching zone wherein they are quenched with water to condense therefrom water vapor and any remaining tar compounds and separating condensed tar from the water condensate.

9. The process of claim 8 in which the heat required to dry the carbonaceous solids is supplied by a hot fluid passed through the drying zone in indirect heat exchange with the carbonaceous solids therein.

10. The process of claim 8 in which condensed tar and solids are removed from the scrubbing zone as a slurry, cooled and a portion of the slurry is returned to the top of the scrubbing zone to condense tar and scrub solids from the drying zone effluent gases.

11. The process of claim 8 in which the heat required to dry the carbonaceous material is transferred through a heat exchange diaphragm contacted on one side by the dense fluidized bed of carbonaceous solids and on the other side by a confined fluidized bed of finely divided combustion catalyst, said heat supplied by the combustion of a hydrocarbon fuel and air introduced into the confined combustion catalyst in proportions to provide a hot combustion mixture and to fluidize said confined combustion catalyst.

References Cited in the file of this patent

UNITED STATES PATENTS

| | | |
|---|---|---|
| 1,670,743 | Schneible | May 22, 1928 |
| 2,399,609 | Wainer | Apr. 30, 1946 |
| 2,414,586 | Egloff | Jan. 21, 1947 |
| 2,445,327 | Keith | July 20, 1948 |
| 2,610,944 | Hemminger | Sept. 16, 1952 |
| 2,658,862 | Horner | Nov. 10, 1953 |